US006593007B2

(12) United States Patent
Donaldson et al.

(10) Patent No.: US 6,593,007 B2
(45) Date of Patent: Jul. 15, 2003

(54) NEUTRALIZATION OF REACTIVE ELEMENTS

(76) Inventors: Keith W. Donaldson, c/o Engineered Materials, Inc., 113 McHenry Rd., No. 179, Buffalo Grove, IL (US) 60089; Nancy L. Harper, c/o Engineered Materials, Inc., 113 McHenry Rd., No. 179, Buffalo Grove, IL (US) 60089

( * ) Notice: Subject to any disclaimer, the term of this patent is extended or adjusted under 35 U.S.C. 154(b) by 0 days.

(21) Appl. No.: 09/838,597

(22) Filed: Apr. 19, 2001

(65) Prior Publication Data

US 2002/0050318 A1 May 2, 2002

Related U.S. Application Data

(60) Provisional application No. 60/198,184, filed on Apr. 19, 2000.

(51) Int. Cl.[7] ................................................ B32B 29/00

(52) U.S. Cl. .................. 428/537.5; 428/511; 428/512; 428/513; 428/373; 428/375; 428/378; 428/384; 427/389.9; 427/384

(58) Field of Search ............................... 428/537.5, 511, 428/512, 513, 373, 375, 378, 384; 427/383.3, 384

(56) References Cited

U.S. PATENT DOCUMENTS 4,944,916 A * 7/1990 Franey ........................... 422/8
5,512,370 A * 4/1996 Edwards et al. ............ 428/373

* cited by examiner

*Primary Examiner*—Leszek Kiliman
(74) *Attorney, Agent, or Firm*—Morris E. Cohen

(57) ABSTRACT

Packaging having reactive polymers incorporated into paper and foam core materials. In one embodiment, the packaging protects the contents from corrosive gases. In an alternate embodiment, the packaging protects the contents from mildew and fungus.

22 Claims, 1 Drawing Sheet

NEUTRALIZATION OF REACTIVE ELEMENTS

RELATED APPLICATIONS

The present application claims the priority of U.S. Provisional Application Serial No. 60/198,184 filed Apr. 19, 2000, which is fully incorporated herein by reference.

FIELD OF THE INVENTION

The present invention is directed to products and processes for the neutralization of gaseous corrosive elements.

BACKGROUND OF THE INVENTION

Many items degrade or tarnish with the passage of time. Metals corrode (tarnish) via several routes, including atmospheric corrosion, galvanic corrosion, and fungal attack. In the case of atmospheric corrosion, the tarnishing occurs by reaction with common gases in the atmosphere. These corrosive gases react with both Ferrous (Iron based) and Non-Ferrous metals. With Non-Ferrous metals (such as Silver, Tin, Copper, Brass, etc.), these gases are usually the primary cause for corrosion.

The most common corrosive gases in the atmosphere are Hydrogen Sulfide (H2S), Carbonyl Sulfide (COS), Sulfur Dioxide (SO2), Hydrogen Chloride (HCl), and Ozone (O3). Hydrogen Sulfide (H2S) is produced as affluent from pulp mills, oil refineries, heavy industry and from decaying vegetation. Carbonyl Sulfide (COS) is produced from fossil fuel combustion (such as burning coal, gasoline or petrol, oil, etc.), wood fires, and under sea fissures which cause an emanation from ocean surfaces. Sulfur Dioxide (SO2) is produced from fossil fuel combustion and from smelting operations. Hydrogen Chloride (HCl) is produced from fossil fuel combustion and reactions with salt water. Ozone (O3) is also produced as a byproduct of combusting fossil fuels.

Metals in nature always assume their most stable state, which in most cases are sulfides, chlorides, oxides, or other salts. As a result, metals begin corroding as soon as they are exposed to the environment. In addition, the most sensitive time for a metal is when it is pristine. In storage, shipment, or manufacture, metals are pristine, and are targets for corrosive gas attack. This corrosion or tarnishing is a particular problem for consumers purchasing fine silver, valuable coins, and so forth.

To address the problems of metal corrosion, U.S. Pat. No. 4,944,916 issued to Franey ("the Franey patent") discloses polymeric bags for preventing the permeation of corrosive materials. However, in some applications, polymeric bags are inconsistent with the traditional methods of packaging or display. Likewise, numerous other types of valuable products other than metals can degrade over time, including paper products such as rare comic books, or so forth. Accordingly, there is a need in the art for paper and foam core based products that inhibit corrosion.

A further problem in the current art is that many materials used in consumer and commercial applications (including construction, clothing, natural materials, manmade materials, appliances, and other products) sustain high humidity in their composition. As a result of this water content, those materials are particularly prone to microbial growths, such as mildew and mold. In many cases it is difficult, not safe, or not practical to use active mildewcides, or fungicides to combat the mold and mildew formation. Thus, there is also a need to reduce mildew and fungal growth on valuable materials, particularly those intended for long term storage.

SUMMARY OF THE INVENTION

It is an object of the present invention to provide methods and products for inhibition of material degradation.

It is a further object of the present invention to provide paper and foam core packaging in which reactive polymers have been incorporated to prevent corrosion.

It is a further object of the present invention to provide packaging that inhibits degradation of the material stored therein, and, in particular, which inhibits corrosion.

It is a further object of the present invention to provide paper and foam core packaging that incorporates reactive polymers to reduce microbial growth, such as mildew and fungus.

It is a yet a further object of the present invention to provide packaging which inhibits microbial growth, such as mildew and fungal growth, on the material stored in the package.

Further objects of the invention will become apparent in conjunction with the disclosure provided herein.

In accordance with the present invention, methods are provided for incorporating reactive polymers into paper and foam core materials. Such methods are employed to produce packaging for storage purposes that protects a product stored within the packaging from experiencing corrosive gases. Alternatively or additionally, the methods can be used to reduce or prevent the growth of undesirable mildew and/or fungus on the product.

In a further embodiment, a paper or foam core product can incorporate a reactive polymer to provide the product itself with corrosion resistant properties, and to inhibit mildew and fungal growth thereon. This can be especially advantageous, for example, in the case of valuable documents.

Thus, using the current methods, the surfaces of paper or foam core products are treated for the purpose of inhibiting degradation resulting from contact with atmospheric gases, whether the degradation of the paper and foam core products themselves, or the degradation of other items placed within those products when the paper and foam products are used as packaging. Such degradation can be in the form of corrosion and/microbial growth (particularly mildew and fungus).

Such undesirable degradation is minimized or prevented using reactive polymers which have been incorporated into or applied to the surface of the paper and foam core, as disclosed herein. By "reactive polymer" (RP) the present invention refers to compounds wherein solid-state reactive materials are incorporated into a polymer matrix. More specifically, such reactive polymers are polymers incorporating a corrosive gas reactant material (the reactant material being any of the transition metals), the reactant material having been catalyzed to become part of the polymeric structure. Such reactive polymers were developed by AT&T Bell Laboratories (currently known as Lucent Bell Labs Technologies), and are disclosed in U.S. Pat. No. 4,944,916 issued to Franey. Similarly, they are discussed in John Franey, *A New ESD Corrosion Preventive Polymer*, EOS/ESD Symposium Proceedings 1991, EOS/ESD Association, Rome N.Y. (which association has a website at www.esda.org), and are discussed at www.staticintercept.com. The contents of that publication and those websites are fully incorporated herein by reference. The materials neutralize corrosive gases commonly associated with corrosion and tarnishing, preventing them from interacting with the underlying material of the protected product or from interacting with the product's contents. Alternatively or additionally, the reactive polymers include copper, which has been known to be a passive mildewcide and fungicide when in intimate contact with an object.

In the preferred embodiment of the invention, the reactive polymers are those available from Engineered Materials, Inc. of Buffalo Grove, Ill. under the trade names Static Intercept® and Corrosion Intercept™. The corrosion reactive polymers are manufactured by catalyzing copper material into polymer chains to form a homogeneous polymeric/metallic structure of low-density polyethylene (LDPE). The static version uses the structure of the corrosion polymer plus an additional catalysis of C12 into the poly-metallic structure to form a copper/metal/oxide semi-conductive media, which utilize the 'Bucky Ball' phenomena to provide paths for electron flow within the structure. The LDPE structures are formed into standard pellets and processed into various final structures, the most common of which is blown film to manufacture bags.

Once incorporated with reactive polymer, the surfaces of the packaging preferably have a chemically neutral pH (preferably in the approximate range of 7.0 to 7.5). Packages are designed so that, when closed, they have RP on the majority of the inside surfaces. In the preferred embodiment of the invention, the treated surfaces of the packaging have greater than two square centimeters of RP surface per square centimeter of surface of the product to be protected therein. Further preferably, the permeability of any package cross sectional structure is approximately or less than 0.015 g/M$^2$ Moisture Vapor Transmission Rate.

Also in accordance with the invention, the paper based packaging materials are comprised of cellulose-based packaging materials, which are of high alpha-cellulose content and are negative to lignin side chains. When packed with the material to be protected, the unfilled interior volume of the package is preferably less than 25% of the total interior volume of the enclosure. In addition, adhesives are avoided in the packaging (and/or in the product), or adhesives are used having chemicals that do not contribute to the corrosion or other degradation of the material to be protected.

DETAILED DESCRIPTION OF THE INVENTION AND THE PREFERRED EMBODIMENTS

Figure 1:
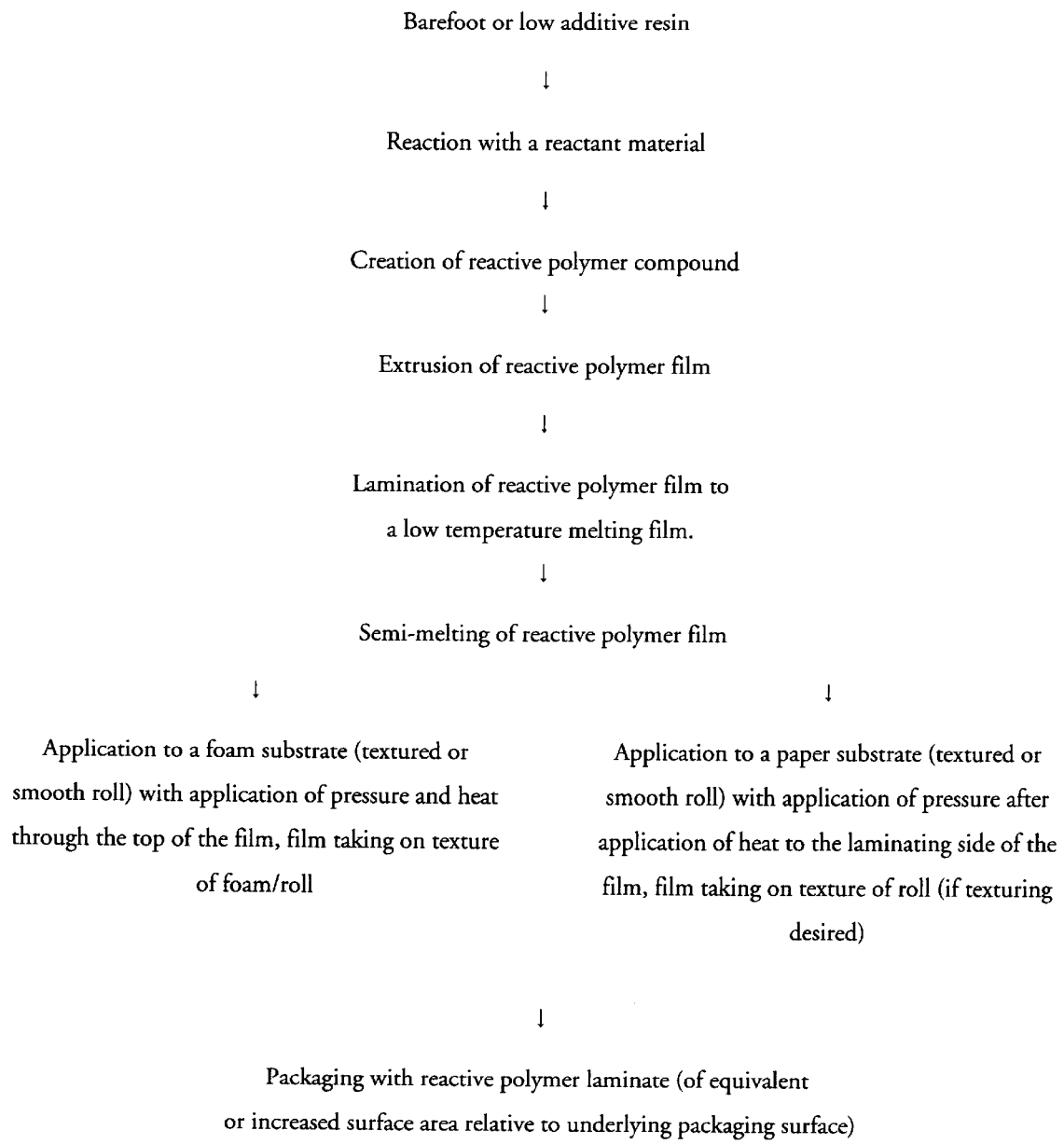
FIG. 1 is a schematic diagram showing a method in accordance with a preferred embodiment of the present invention.

In accordance with the present invention, paper and foam core materials are provided for the inhibition of degradation, whether in the form of corrosion and/or microbial growth such as mildew and/or fungus. The materials can be treated with protective coatings for the purpose of protecting the contents of the packaging from undesirable chemical reactions and/or for the purpose of protecting the materials themselves.

When used as packaging materials, the present products are designed to be an alternative to the use of polymeric bags as disclosed in the Franey patent, U.S. Pat. No. 4,944,916, which is fully incorporated herein by reference. Such polymeric bags, formed from reactive polymers such as those used herein, have a non-transparent surface, preventing their use in applications when viewing the contents of the packaging is necessary. In addition, in certain applications, cellulose-based packaging or products are utilized. Whereas the Franey patent is directed to plastic bags, the present patent is directed to protective enclosures in the form of paper or foam core.

For example, in the case of the storage of valuable metal objects (such as valuable coins, silverware, or so forth), the owners of such objects often wish to store the object for the long term. Particularly with collectibles, it is often desired that the storage be in a transparent box so that the object can be viewed when desired, without the need to open the box, which would accelerate tarnishing.

As a result, paper and foam core is provided herein which can be used as packaging or as a base for the object (e.g. a coin) within the box, while still utilizing a transparent casing to allow for viewing the collectible. Although a coin or collectible is often referred to herein, it is to be understood that such examples are used merely for illustrative purposes. The principles of the present invention can be applied to allow long-term storage of any other object in a paper or foam core treated package (e.g., fine silver, documents, comic books, photographs, artwork, magazines, baseball cards, film, etc.), or can to provide protection of any cellulose-based materials themselves, such as paper or foam core objects.

In one embodiment, the foam core is preferably a gasket around the coin or other object, so that the owner can view the coin's front and back. This gasket extends from the edges of the object until the inner surface of the casing (i.e. the walls of the box). In accordance with the present invention, it is desirable that the dimensional difference between the inner diameter of the box and the outer diameter of the object being stored is taken into account such that the treated surface area of the gasket is at least equal to the surface area of the object being stored; preferably the treated surface area is significantly greater than the surface area of the object to be protected.

For single objects, a box is normally utilized, the box preferably being hermetically sealed to further minimize exposure to atmospheric corrosives and undesirable organisms. Alternatively, and especially for multiple objects, paper sheets can be utilized (as is known, for example, in coin collecting). In accordance with the invention, those sheets are laminated. The outer layer of the paper is laminated with reactive polymer, in accordance with the method disclosed below. Preferably, the inner cover of the album is laminated with the reactive polymer also.

The product (such as the coin, document, or so forth) can sit directly on the paper; for example, it can have a clear Mylar overlay or other plastic overlay to further protect it from the environment by reducing the flow of air with corrosive material over that product. Additional blank sheets coated with reactive polymer (e.g. every other sheet) are provided in the album or in proximity to the object, to further increase the active surface area of reactive polymer in proximity to the product. To yet further maximize protection, the entire sheet or album can be placed into a further reactive polymer covered enclosure, such as a cardboard box with reactive polymer laminated to the interior of the box, or a treated bag, or so forth.

In accordance with the invention, any type or shape packaging material can be provided. The packaging material includes a layer of material (exposed to atmospheric air) having a reactive polymer that covers the cellulose-based packaging material. Preferably, the packaging is in the form of an enclosure for containing or holding an item therein. For example, the packaging can be a box, a sleeve, an envelope, a book, an album, a case, a coin book, a baseball cardholder, a coin holder, or so forth. Those packages can be entirely made of a cellulose material such as paper or foam core, or can include other materials as well. For example, the packaging can include a window or so forth. In the case of a window, for example, that window is preferably a plastic film coated with reactive polymer as well.

The paper or foam core material laminated with reactive polymer is designed to be a sacrificial and preferential corrosive gas reacting material, neutralizing the contents of atmospheric gases that would otherwise cause corrosion. Additionally or alternatively, the material is designed to present active material on its surface that inhibits the growth of undesirable organisms. The latter is preferably accomplished by using reactive polymers incorporating copper, which has been known to be a passive mildewcide and fungicide when in intimate contact with an object.

In accordance with the preferred embodiment of the invention, the surface of the packaging material is further designed to present an active surface area, which is greater than the normal surface area of a solid area of the underlying base material. In other words, one square centimeter surface of packaging incorporates greater than one square centimeter of active anti-corrosive surface area, with that anti-corrosive surface area being presented on the surface of that packaging to interact with the outside environment. This presentation of a greater active anti-corrosive surface area than area of underlying base surface is achieved by texturing the coating placed on the base packaging surface, as further discussed below. It is desirable that the active surface area be at least five percent greater than the untreated surface area, and preferably is even higher, such as ten, twenty, fifty, one hundred, two hundred percent or greater.

In a further alternative or additional embodiment, the packaging is provided so that the active reaction surface is at least equal to the surface area of product to be packaged therein and is preferably greater. Preferably, the active reaction surface is greater than the surface area of contained product. Further preferably, at least two square centimeters of active reaction surface is presented per square centimeter of corrodible (or growth prone) surface of the product to be packaged therein. It should be noted that, as opposed to the index discussed in the preceding paragraph (which is one that compares treated active surface area versus untreated surface area of packaging), the index discussed in the present one is a comparison of treated surface area versus surface area of product contained in the package.

This added active surface area is particularly important in the storage of products that are repeatedly inserted into and removed from the packaging. Repeated removal from and reinsertion into the packaging results in an increased flow of air over the surface of the protected product. That air includes corrosive gases and microscopic organisms therein. Consequently, a higher degree of protection is required than for products, which are stored long term in packaging without removal from the packaging.

Likewise, a higher degree of protection can also be necessary for items packaged in foam core. Such items are often partially, but not totally, surrounded by the foam core material (as opposed to a treated bag which will entirely surround its contents), resulting in a need for the foam core to do additional work in cleansing the entrapped environment of corrosive or biologic elements.

Thus, as disclosed above, it is an object of the present invention to provide a method for laminating paper and foam core with reactive polymers for the minimization of corrosion or microbial growth.

In a first step of the present method, as shown in FIG. 1, a barefoot or low additive resin is provided. Preferably, the resin is a plastic material in the form of a polyolefin, polyester, nylon, or polyurethane.

In a second step, appropriate anti-corrosive or anti-microbial additives are provided in accordance with the prior art. These additives can be any materials such as those discussed in the Franey patent. In the preferred embodiment, the additives are LDPE, catalysts, Copper Oxide Semiconductors, and C12.

In the third step of the present method, the resin is reacted with the additives to produce a plastic compound with the desired anti-corrosive and/or anti-microbial properties, i.e. a "reactive polymer". Preferably the reactive polymers are formed by incorporating approximately 5 to 50 weight % solid-state reactive materials (in particular, any of the transition metals) into a polymer matrix. In the preferred embodiments, this compound or reactive polymer is LDPE, LLDPE, ULDPE, HDPE, PP, Styrene, Urethane, Acrylic or PET based. This reaction is conducted by the addition of the products of incorporation under the process described in the Franey patent. Such reactive polymers are known in the art. In the preferred embodiment, as an alternative to the formulation of a reactive polymer, a finished reactive polymer compound (i.e. a finished compound formed by reaction of the resin with the additives) is obtained from Engineered Materials, Inc. of Buffalo Grove, Ill. under the trade names Static Intercept® and Corrosion Intercept™.

In a fourth step of the present method, this reactive polymer compound is extruded using known extrusion techniques to form a plastic film.

In a fifth step of the invention, this plastic film is laminated using known techniques to a low temperature melting film. The low temperature melt film does not need to be a reactive polymer, and in the preferred embodiment is not one. The low temperature melt film can be any of numerous materials, including, for example, HDPE, LDPE, LLDPE, Metallocene, or ULDPE. In the preferred embodiment, it is a blend of Low Density Polyethylene (LDPE), Linear Low Density Polyethylene (LLDPE) and a Metallocene Low Density Polyethylene (MET). The preferred relative blend of the resins is 18% MET, 20% LLDPE and 62% LDPE. This ratio is preferred as it balances low melt temperature with strength and process ability.

The resin used in the reactive polymer process is also preferably specified to have minimal chemical additives to reduce processing requirement to significantly reduce the potential for out gassing.

The removal of the processing aids and the addition of the Metallocene resin requires more controlled extrusion (narrower temperature band) and slower extrusion speeds. The film, therefore, has to be completely cooled before it can be collapsed upon itself to avoid the film from "blocking", i.e. adhering to itself.

In a sixth and seventh step of the invention, the film is semi-melted and applied to a foam or paper substrate. As previously discussed, it is desirable that the active surface area of reactive polymer presented on the surface of the packaging material be greater than the actual surface area of that packaging material itself. In accordance with the present invention, to achieve this, the reactive polymer is applied as a laminate to the surface of the packaging material in the form of an embossed plastic film, resulting in a non-flat surface after application. The embossing is not done for aesthetic purposes, but, rather, is functional. Specifically, the embossing of the laminate onto the paper or foam core material results in a textured surface on that material. This textured surface presents a greater surface area to the environment than would an untreated flat surface, due to the fact that the three dimensional features of the surface texturing (such as hills and valleys which extend upward and downward respectively), increase the effective surface area presented compared to a flat plain.

This three dimensional surface is created by embossing the laminate onto the paper or foam core by contact with a pressure roller which has been etched to leave a pattern of high and low spots on the pressure contact roll. Each of those high and low spots (i.e. hills and valleys) expose greater amounts of reactive polymer than presented on a flat surface.

The lamination of plastic film to the paper or foam core has previously traditionally involved heat; however, the application of heat can cause the plastic film to shrink, curl or otherwise become distorted. Normally, this would be addressed by using resins that are heat-resistant. However, heat-resistant resins generally do not emboss, or do not emboss well.

Consequently, in accordance with the present invention, a two-layer laminate is used. This two-layer laminate includes both a heat tolerant (i.e. heat resistant) reactive polymer layer and a heat intolerant (non-heat resistant) layer. The heat tolerant layer melts at a higher temperature than the heat intolerant layer. This two layer laminate allows lamination using heat and embossing, without adhesives and without distortion, burn through, or melt through as a result of the application of the heat.

With respect to this two-layer laminate, the heat tolerant or high temperature layer is the top layer of the film once the laminate applied to the packaging. That outside heat tolerant layer is the surface that is embossed with the pressure roller, and the surface that is exposed to atmospheric gases.

Below that top layer is a layer of the heat intolerant or low temperature material, which is melted onto the packaging. The lowest layer, below that low temperature material, is the packaging itself.

In the case of paper, the low temperature (heat intolerant) layer of the film is heated with a heated roller, and then pressure is used to apply the two layers of film to the paper product. The low temperature side melts onto the paper affixing the two-layer laminate onto that paper.

In the case of foam, the heat is applied to the drum, and the drum is used to apply heat to the high temperature layer of the film, the layer that contains the reactive polymer material. That heat is transferred through both layers of the film to heat the lower low temperature layer, converting the low temperature layer into a semi-molten state. That semi-molten low temperature layer is then touched to the foam core using low pressure.

Thus, while the lamination of the present invention still uses heat, a two-layer system is used to minimize the potential negative effects of that heat on the plastic film. Likewise, the use of heat avoids the use of liquid based adhesives to apply the plastic film to the packaging.

To avoid strong curling, the film is preferably supported while it is heated. For example, in one embodiment, the plastic, two layered, film travels across a large diameter heated drum, which heats the plastic film. The large diameter drum is heated to a temperature in excess of the softening point of the film (in the range of 350 degree Fahrenheit to 500 degrees, depending on the machine speed—the slower the machine speed, the lower the temperature that needs to be employed). The drum also acts as a supporting mechanism to avoid stretching the film as it heats.

This heated film is then pressed into the paper or foam core using a pair of closed nip rollers. Steel or metallic rollers, as known in the art, are preferably used (the rollers being coated with rubber or other materials or uncoated). The semi-melted plastic film under pressure thereby melts into the paper or foam core substrate, producing a strong lamination bond with no potential for undesirable out gassing.

As an alternative to the use of a large diameter heated drum, the film can be heated under low tension in an oven, with the heated film being applied to the substrate using a textured or patterned roll.

Additionally, as a preferred alternative to application of the reactive polymer to foam core using a pressure roller, the reactive polymer can be extrusion coated onto foam. This is done by application of the two-layered film directly onto the semi-molten extruded product as it exits the extrusion process. The low temperature layer of the film begins to melt, and the melting action adheres the film to the surface of the foam. Since the foam material has an uneven and irregular surface, the film (which reaches its softening point at approximately 160 to 200 degrees Fahrenheit) conforms to the irregular surface, increasing the effective surface area of the reactive polymer per square unit of measurement. The texture of the core is therefore used to create an effect like the embossing previously discussed.

The resulting reactive polymer "film" or "skin" on the foam has little stress induced in it, as compared to the stress induced into blown or cast film. The reduced stress in the "film" anneals the polymer surface and allows an even distribution of reactant particulates throughout the material. Normally, a pure polymer 'skin' void of non-polymeric materials forms on the surface due to the pressures of lamination which force heavier density materials toward the center of a semi-molten material (the reactive polymer film material has a higher density than polymeric structures). In contrast, the present process allows a copper ion rich surface to be achieved, which acts as a passive mildewcide and fungicide as discussed above.

Additionally, in the case of the application of the film to foam, the reactive polymer film is adhered to the foam surface following an initial foaming setup as the foam cools. At that stage the foam is cool enough to be stiff enough to support itself and the reactive polymer film, but hot enough to heat laminate with the reactive polymer. This extra support significantly reduces film distortion.

Using the above methods, a paper or foam core product is produced which is coated with reactive polymer. The surfaces of the packaging are preferably coated on the interior, to present active surface in proximity to the product to be protected, and it is desired that those interior surfaces have a chemically neutral pH, preferably in the approximate range of 7.0 to 7.5). Preferably, the treated surfaces of the packaging have greater than two square centimeters of active reaction surface per square centimeter of surface of the product, which is desired to be protected. To minimize the entrance of atmospheric contaminants, the permeability of any protected package wall is generally desired to be approximately 0.015 $g/m^2$ Moisture Vapor Transmission Rate or less. Packaging materials are used wherein the materials are cellulose-based, have a high alpha-cellulose content, and are negative to lignin side chains. Additionally, when packed with the material to be protected, the unfilled interior volume of the package is preferably less than 25% of the total interior volume of the enclosure.

In accordance with the present invention, it is further desirable that the laminated paper or foam core product not use adhesives, or that it use adhesives having chemicals which do not contribute to the corrosion or other degradation of the material to be protected. The solvent-based adhesives used in traditional lamination processes contain VOCs (volatile organic compounds), which can outgas out of the laminated product introducing further contaminants into the package. The product of this out gassing can potentially harm, discolor, or otherwise alter the appearance of the material requiring protection. Furthermore, laminations using solvent or liquid based adhesives require heat to drive off the carrier solvent. This application of heat while the laminate is under tension passing through the ovens required to thoroughly dry the adhesive, can cause unsupported film to shrink, curl, or become distorted, making downstream applications and processes more difficult. Thus, no solvent-based adhesives are used in the initial steps to adhere the reactive polymer plastic film to its immediate substrate (whether paper or the foam core). In addition to the above, further methods are used for paper or cardboard stock which is relatively thick. Typically, paper of approximately 1-to 60-mil thickness paper can be heat laminated to plastic. However, if one bonds plastic onto>40 mil paper with heat, the paper will curl; thus, to avoid curling, a formula is used wherein the thickness of the plastic is approximately equal to the paper. For example, a 3-mil plastic is bonded to a 3-mil paper substrate. In general, one can go up from approximately one to three times (1–3x) the thickness of the plastic in paper using heat lamination, while still avoiding curling. For example, a 2 mil plastic can be laminated onto anything from 2–6 mil paper, without curling posing a problem.

That structure of plastic and paper is then applied to another sheet of paper or board (or other products) under pressure without heat, using a water adhesive based system. This can be done as often as desired to make the thickness of paper needed. Therefore, if one wants plastic film laminated to a paper product which is thicker than 60 mils, one has to first laminate the plastic to paper 60 mil or under, and then to laminate the paper to a second sheet of paper. The excess water will permeate out of the non-plastic laminated paper surfaces.

Having described this invention with regard to specific embodiments, it is to be understood that the description is not meant as a limitation since further embodiments, modifications and variations may be apparent or may suggest themselves to those skilled in the art. It is intended that the present application cover all such embodiments, modifications and variations.

What is claimed is:

1. An article of manufacture, comprising:
    a packaging material, said packaging comprising cellulose, said packaging comprising a surface comprising a reactive polymer, said reactive polymer comprising a polymer and a reactant material, said reactant material being a transition metal.
2. An article as claimed in claim 1, wherein said packaging comprises paper.
3. An article as claimed in claim 1, wherein said packaging comprises foam core.
4. An article as claimed in claim 1, wherein said surface comprising a reactive polymer has a pH of approximately 7.0 to 7.5.
5. A article as claimed in claim 1, wherein said packaging material comprises an enclosure.
6. A article as claimed in claim 1, wherein said cellulose-based surface is of high alpha-cellulose content.
7. A article as claimed in claim 1, wherein said cellulose-based surface is negative to lignin side chains.
8. An article as claimed in claim 1, wherein said surface comprising a reactive polymer is three dimensional, such that said surface comprising a reactive polymer has a higher surface area than a flat surface.
9. An article as claimed in claim 1, wherein said surface comprising a reactive polymer is embossed.
10. An article as claimed in claim 1, wherein said reactive polymer comprises copper.
11. An article as claimed in claim 1, wherein said reactive polymer comprises copper incorporated into polymer chains of polyethylene.
12. An article as claimed in claim 1, wherein said packaging comprises a cross section, and wherein the permeability of said cross section is approximately 0.015 g/M$^2$ Moisture Vapor Transmission Rate or less.
13. A method for manufacture of packaging material, comprising:
    providing a cellulose-based material; and,
    applying a reactive polymer to said material, said reactive polymer comprising a polymer and a reactant material, said reactant material being a transition metal.
14. A method as claimed in claim 13, further comprising the step of forming said material into an enclosure.
15. A method as claimed in claim 13, wherein said material comprises paper.
16. A method as claimed in claim 13, wherein said material comprises foam core.
17. A method as claimed in claim 13, wherein said reactive polymer is incorporated into a film, and wherein said film is applied to the surface of said cellulose-based material.
18. A method as claimed in claim 13, wherein said film comprises at least two layers, a first layer and a second layer, said second layer melting at a lower temperature relative to the melting temperature of said first layer.
19. A method as claimed in claim 17, further comprising the step of embossing said film.
20. A method as claimed in claim 18, further comprising the step of embossing said film.
21. An article as claimed in claim 13, wherein said reactive polymer comprises copper.
22. An article as claimed in claim 13, wherein said reactive polymer comprises copper incorporated into polymer chains of polyethylene.

* * * * *